US012660014B2

(12) United States Patent　　(10) Patent No.:　US 12,660,014 B2
Chen et al.　　　　　　　　　　 (45) **Date of Patent:　　*Jun. 16, 2026**

(54) INFORMATION TRANSMISSION METHOD, BASE STATION, MOBILE TERMINAL, AND COMPUTER READABLE STORAGE MEDIUM

(71) Applicant: VIVO MOBILE COMMUNICATION CO., LTD., Chang'an Dongguan (CN)

(72) Inventors: Li Chen, Chang'an Dongguan (CN); Dajie Jiang, Chang'an Dongguan (CN); Fei Qin, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 695 days.

This patent is subject to a terminal disclaimer.

(21) Appl. No.: 18/097,660

(22) Filed: Jan. 17, 2023

(65) Prior Publication Data

US 2023/0156810 A1　　May 18, 2023

Related U.S. Application Data

(63) Continuation of application No. 16/622,025, filed as application No. PCT/CN2018/090596 on Jun. 11, 2018, now Pat. No. 11,582,803.

(30) Foreign Application Priority Data

Jun. 12, 2017　(CN) ......................... 201710439672.6

(51) Int. Cl.
　　*H04W 76/11*　　　(2018.01)
　　*H04W 8/24*　　　 (2009.01)
　　　　　　　(Continued)

(52) U.S. Cl.
　CPC .............. *H04W 76/11* (2018.02); *H04W 8/24* (2013.01); *H04W 68/005* (2013.01);
　　　　　　　(Continued)

(58) Field of Classification Search
　CPC . H04W 74/0833; H04W 76/11; H04W 76/27; H04W 72/23; H04W 8/24; H04W 68/005; H04W 72/0446; H04W 72/0453
　See application file for complete search history.

(56) References Cited

U.S. PATENT DOCUMENTS

2008/0232329 A1　9/2008　Jen
2011/0320702 A1　12/2011　Lin
　　　　　(Continued)

FOREIGN PATENT DOCUMENTS

CN　　101772173 A　　7/2010
CN　　101969697 A　　2/2011
　　　　(Continued)

OTHER PUBLICATIONS

NPL 1—3GPP TS 36.321 V14.2.1 (Mar. 2017) 3rd Generation Partnership Project; Technical Specification Group Radio Access Network; Evolved Universal Terrestrial Radio Access (E-UTRA); Medium Access Control (MAC) protocol specification (Release 14).
　　　　　(Continued)

*Primary Examiner* — Siren Wei

(57)　　　　　　ABSTRACT

An information transmission method, a base station, a mobile terminal, and a computer readable storage medium are provided. The information transmission method includes transmitting, to a mobile terminal, configuration information of a target frequency point used by the mobile terminal in a random access procedure, wherein the configuration information includes time slot information corresponding to the target frequency point and/or identification information of the target frequency point.

20 Claims, 5 Drawing Sheets

(51) Int. Cl.

| | | |
|---|---|---|
| *H04W 68/00* | (2009.01) | |
| *H04W 72/0446* | (2023.01) | |
| *H04W 72/0453* | (2023.01) | |
| *H04W 72/23* | (2023.01) | |
| *H04W 74/0833* | (2024.01) | |
| *H04W 76/27* | (2018.01) | |

(52) U.S. Cl.

CPC ... *H04W 72/0446* (2013.01); *H04W 72/0453* (2013.01); *H04W 72/23* (2023.01); *H04W 74/0833* (2013.01); *H04W 76/27* (2018.02)

(56) References Cited

U.S. PATENT DOCUMENTS

| | | | |
|---|---|---|---|
| 2012/0322455 A1 | 12/2012 | Oh | |
| 2014/0098761 A1 | 4/2014 | Lee et al. | |
| 2014/0133424 A1* | 5/2014 | Yoshizawa | H04W 52/0206 |
| | | | 370/329 |
| 2014/0369242 A1* | 12/2014 | Ng | H04L 5/001 |
| | | | 370/280 |
| 2015/0173054 A1 | 6/2015 | Ohta et al. | |
| 2015/0373740 A1* | 12/2015 | Eriksson | H04W 74/006 |
| | | | 370/329 |
| 2016/0135247 A1 | 5/2016 | Ozturk et al. | |
| 2017/0273113 A1* | 9/2017 | Tirronen | H04W 72/23 |
| 2020/0037355 A1 | 1/2020 | Fei et al. | |

FOREIGN PATENT DOCUMENTS

| | | |
|---|---|---|
| CN | 102457929 A | 5/2012 |
| CN | 103298121 A | 9/2013 |
| CN | 103491547 A | 1/2014 |
| CN | 103491548 A | 1/2014 |
| CN | 103491583 A | 1/2014 |
| CN | 108811155 A | 11/2018 |
| EP | 1981188 A1 | 10/2008 |
| WO | 2009075632 A2 | 6/2009 |
| WO | 2010124228 A2 | 10/2010 |

OTHER PUBLICATIONS

NPL 2—3GPP TS 36.331 V14.2.2 (Apr. 2017) 3rd Generation Partnership Project; Technical Specification Group Radio Access Network; Evolved Universal Terrestrial Radio Access (E-UTRA); Radio Resource Control (RRC); Protocol specification (Release 14).
Extended European Search Report related to Application No. 24200571. 8; reported on Jan. 27, 2025.
First Chinese Office Action related to Application No. 201710439672. 6; reported on Nov. 11, 2019.
Second Chinese Office Action related to Application No. 201710439672. 6; reported on Mar. 13, 2020.
First United States Non-Final Office Action related to U.S. Appl. No. 16/622,025; reported on Mar. 26, 2021.
Second United States Non-Final Office Action related to U.S. Appl. No. 16/622,025; reported on May 19, 2022.
Extended European Search Report related to Application No. 18817003. 9; reported on Apr. 20, 2020.
International Search Report and Written Opinion related to Application No. PCT/CN2018/090596; reported on Jun. 11, 2018.
R1-1706905—Source: Huawei, HiSilicon "Overview of NR UL for LTE-NR coexistence", Agenda Item: 7.1.8, Document for: Discussion and decision, 3GPP TSG RAN WG1 Meeting #89, Hangzhou, China, May 15-19, 2017.
R1-1707421—Source: Intel Corporation "NR LTE coexistence remaining issues", Agenda Item: 7.1.8, Document for: Discussion and Decision, 3GPP TSG RAN WG1 Meeting #89, Hangzhou, P.R. China May 15-19, 2017.
R1-1707464—Source: CATT "Further details on NR 4-step RA Procedure", Agenda Item: 7.1.1.4.2, Document for: Discussion and Decision, 3GPP TSG RAN WG1 Meeting #89, Hangzhou, P.R. China May 15-19, 2017.
R1-1707528—Source: CATT "Support of UL carrier sharing between NR-LTE", Agenda Item: 7.1.8, Document for: Discussion, 3GPP TSG RAN WG1 Meeting #89, Hangzhou, P.R. China May 15-19, 2017.
R1-1707933—Source: Samsung "4-step RACH procedure", Agenda Item: 7.1.1.4.2, Document for: Discussion and Decision, 3GPP TSG RAN WG1 Meeting #89, Hangzhou, China, May 15-19, 2017.
R1-1708305—Source: Motorola Mobility, Lenovo "RACH configuration and procedure", Agenda Item: 7.1.1.4.2, Document for: Discussion and decision, 3GPP TSG RAN WG1 Meeting #89, Hangzhou, P.R. China May 15-19, 2017.
R1-1708654—Source: Qualcomm Incorporated "NR-LTE Adjacent Channel Coexistence Consideration", Agenda Item: 7.1.8, Document for: Discussion/Decision, 3GPP TSG-RAN WG1 #89, Hangzhou, P.R. China May 15 -19, 2017.

* cited by examiner

Acquiring configuration information of a target frequency point used in a random access procedure, wherein the configuration information includes time slot information corresponding to the target frequency point and/or identification information of the target frequency point ⟩⟩301

INFORMATION TRANSMISSION METHOD, BASE STATION, MOBILE TERMINAL, AND COMPUTER READABLE STORAGE MEDIUM

CROSS-REFERENCE TO RELATED APPLICATION

This application claims the benefit of and is a continuation application of U.S. patent application Ser. No. 16/622,025 filed on Dec. 12, 2019 which is a U.S. national phase application of a PCT Application No. PCT/CN2018/090596 filed on Jun. 11, 2018, which claims priority to a Chinese Patent Application No. 201710439672.6 filed in China on Jun. 12, 2017, the disclosure of which is incorporated herein by reference in its entirety.

TECHNICAL FIELD

The present disclosure relates to the field of communication technology, and more particularly, relates to an information transmission method, a base station, a mobile terminal, and a computer readable storage medium.

BACKGROUND

In a random access during mobile communication, a User Equipment (UE) performs an access through a Random Access Channel (RACH) resource configured at a fixed frequency point. This access is less flexible. Moreover, in a case that the number of UEs is large, a congestion probability of a random access is increased.

Meanwhile, if a Fifth Generation (5G) New Radio (NR) is deployed on a C carrier (around 3.5 GHz), downlink budget difference over 3.5 GHz is large (a downlink transmission loss is about 10 dB less than an uplink transmission loss), causing that an uplink coverage range is obviously smaller than a downlink coverage range, and the uplink coverage is limited, and an access success rate of a mobile terminal at a cell edge is greatly reduced.

SUMMARY

The present disclosure provides an information transmission method, a base station, a mobile terminal, and a computer readable storage medium.

In a first aspect, the present disclosure provides an information transmission method applied to a base station and includes transmitting, to a mobile terminal, configuration information of a target frequency point used by the mobile terminal in a random access procedure, wherein the configuration information includes time slot information corresponding to the target frequency point and/or identification information of the target frequency point.

In a second aspect, the present disclosure also provides an information transmission method applied to a mobile terminal and includes acquiring configuration information of a target frequency point used in a random access procedure, wherein the configuration information includes time slot information corresponding to the target frequency point and/or identification information of the target frequency point.

In a third aspect, the present disclosure also provides a base station. The base station includes a first transmission module, configured to transmit, to a mobile terminal, configuration information of a target frequency point used by the mobile terminal in a random access procedure, wherein the configuration information includes time slot information corresponding to the target frequency point and/or identification information of the target frequency point.

In a fourth aspect, the present disclosure also provides a base station. The base station includes a first storage and a first processor, wherein the first storage stores a first computer program executable by the first processor, and when the first processor executes the first computer program, the first computer implements the steps in the information transmission method according to the first aspect.

In a fifth aspect, the present disclosure also provides a non-volatile computer readable storage medium. The non-volatile computer readable storage medium includes a first computer program stored thereon, wherein when the first computer program is executed by a processor, the processor implements the steps of the information transmission method according to the first aspect.

In a sixth aspect, the present disclosure also provides a mobile terminal. The mobile terminal includes a third acquisition module, configured to acquire configuration information of a target frequency point used in a random access procedure, wherein the configuration information includes time slot information corresponding to the target frequency point and/or identification information of the target frequency point.

In a seventh aspect, the present disclosure also provides a mobile terminal. The mobile terminal includes a second storage and a second processor, wherein the second storage stores a second computer program executable by the second processor, and when the second processor executes the second computer program, the second processor implements the steps of the information transmission method according to the second aspect.

In an eighth aspect, the present disclosure also provides a non-volatile computer readable storage medium. The non-volatile computer readable storage medium includes a second computer program stored on the non-volatile computer readable storage medium, wherein when a processor executes the second computer program, the processor implements the steps of the information transmission method according to the second aspect.

DETAILED DESCRIPTION

A technical solution of the present disclosure will be clearly and completely described hereinafter in conjunction with drawings of the present disclosure. It is apparent that the described embodiments are a part, rather than all, of the embodiments of the present disclosure. Based on the embodiments of the present disclosure, all other embodiments acquired by those of ordinary skills in the art without creative work are within the scope of the present disclosure.

The information transmission method, the base station, the mobile terminal, and the computer readable storage medium provided by the present disclosure may solve a problem that in a case that multiple mobile terminals perform an access through a RACH resource configured at one fixed frequency point, a congestion probability of random access is improved.

Figures 1, 2:
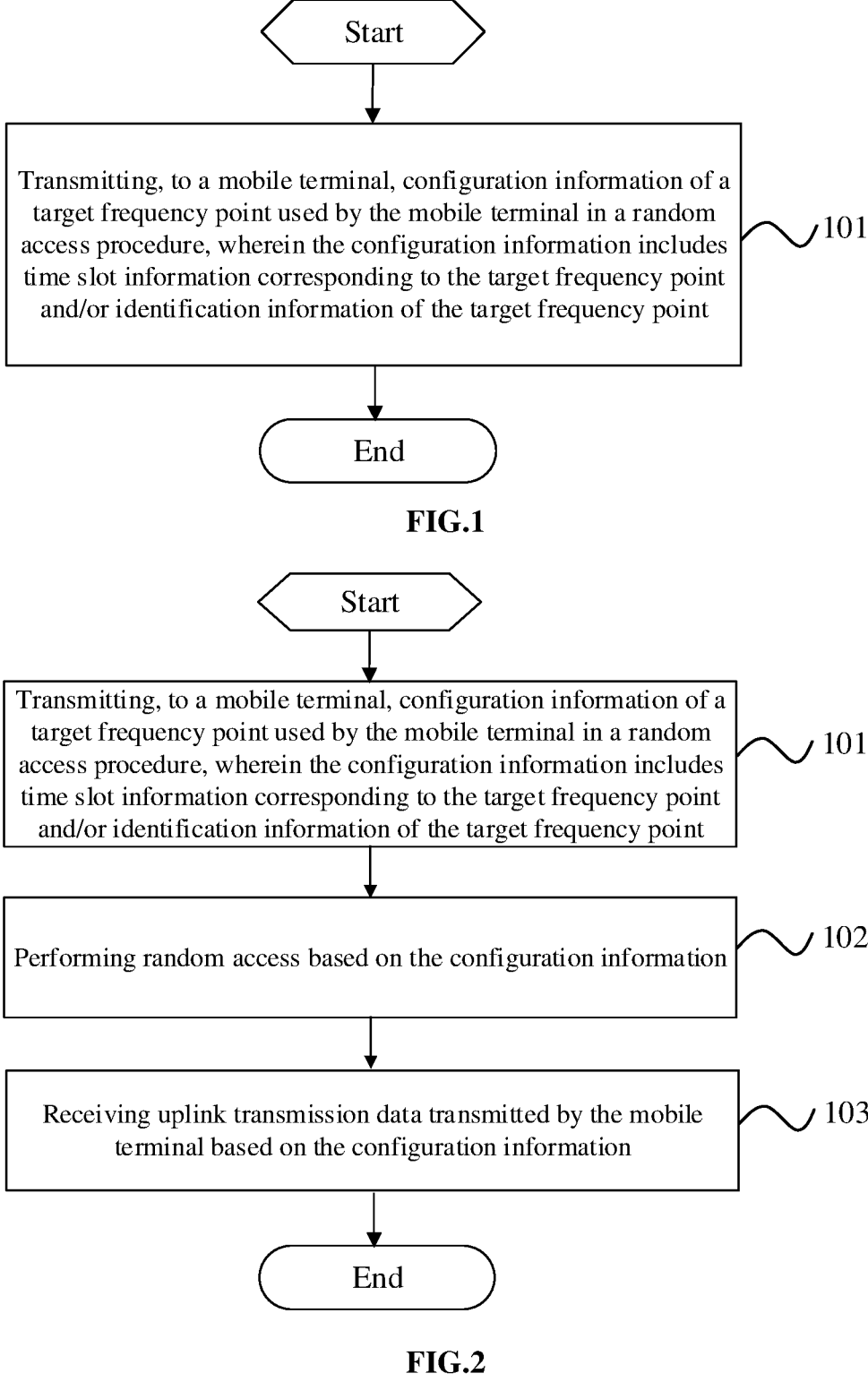
FIG. 1 is an operational flow chart of an information transmission method of the present disclosure.
FIG. 2 is an operational flow chart of an information transmission method of the present disclosure.

As shown in FIG. 1, the present disclosure provides an information transmission method. The information transmission method is applied to a base station and includes a step 101.

Step 101: transmitting to a mobile terminal configuration information of a target frequency point used by the mobile terminal in a random access procedure, wherein the configuration information includes time slot information corresponding to the target frequency point and/or identification information of the target frequency point.

The target frequency point includes a first service frequency point of a non-New Radio (NR) communication system and/or a second service frequency point of a NR communication system, wherein the NR communication system is a communication system in which the mobile terminal is located, the non-NR communication system is specifically a Long Term Evolution (LTE) communication system, and the first service frequency point is specifically 1.8 GHz or 800 MHz, or 900 MHz, or 2.3 GHz, or 2.6 GHz, or 2.1 GHz. The 1.8 GHz is taken as an example below, and other frequency points are similar in principle. The second service frequency point is a frequency point deployed for a 5G NR including 3.5 GHz or other frequency points. The 3.5 GHz is taken as an example, and the other frequency points are similar in principle. The target frequency point may be a frequency point used by a first interactive message msg. 1 (a preamble sequence), a second interactive message msg. 2, a third interactive message msg. 3, a fourth interactive message msg. 4 and a fifth interactive message msg. 5 in a random access procedure, or may be a frequency point used in an entirety of a random access procedure.

The frequency points mentioned above are commonly used in the industry, and specific information of the frequency point is as follows:

For a time division duplex (TDD) system:

1.8 GHz: 1880-1900 MHz (bands: 39);

2.3 GHz: 2320-2370 MHz, or 2300-2320 MHz, or 2370-2390 MHz (bands: 40);

2.5 GHz: 2575-2635 MHz, or 2555-2575 MHz, or 2635-2655 MHz (bands: 41).

For a Frequency Division Duplex (FDD) system 1.8 GHz: 1755-1785 MHz/1850-1880 MHz;

2.1 GHz: 1955-1980 MHz/2145-2170 MHz;

The frequency points of 800 MHz, 900 MHz also include any one of 800 MHz and 900 MHz used in a Code Division Multiple Access (CDMA) system, a Global System for Mobile Communications (GSM) system, a Time Division-Synchronous Code Division Multiple Access (TD-SCDMA) system.

The time slot information includes a time slot or a part of time slots configured by a base station other than a predetermined time slot, wherein the predetermined time slot is a time slot for downlink reception by the mobile terminal using a downlink service frequency point of the NR communication system.

Specifically, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

For example, the NR system shares 1.8 GHz with the LTE system in uplink, and in a case that downlink reception is performed using 3.5 GHz, uplink transmission may not be performed using 1.8 GHz at the same time; only in a case that the downlink reception is not performed using 3.5 GHz, the mobile terminal (UE) may perform uplink transmission using 1.8 GHz. This scheme allows the UE to have only one transceiver for performing uplink and downlink transmission at separated time points. In this way, not only a cost of a duplexer may be saved, but also influence from crosstalk interference and second harmonics may be reduced.

Here, in a case that the 5G NR (new radio) is deployed on a C carrier (around 3.5 GHz), an uplink coverage is enhanced by sharing a low frequency point with the LTE system, and an access success rate of a mobile terminal at a cell edge is improved.

As an optional implementation, before the above step 101, the information transmission method further includes acquiring, by pre-definition, configuration information of the target frequency point used in the random access procedure.

The step 101 specifically includes transmitting the configuration information of the target frequency point to a mobile terminal through at least one of a dedicated Radio Resource Control (RRC) signaling, a RRC reconfiguration message, a RRC configuration message, a Random Access Channel (RACH) configuration signaling, a system message, and a broadcast message.

Optionally, before the step 101, the method further includes acquiring capability information reported by the mobile terminal, wherein the capability information includes a frequency point supported by the mobile terminal; configuring the target frequency point used by the mobile terminal in the random access procedure based on the capability information.

Specifically, if the frequency point supported by the mobile terminal includes a first service frequency point, it may be determined that the target frequency point is a first service frequency point and/or a second service frequency point; if the frequency point supported by the mobile terminal includes the second service frequency point, it may be determined that the target frequency point is the second service frequency point.

Further, as shown in FIG. 2, after the above step 101, the information transmission method further includes a step 102.

Step 102: performing a random access based on the configuration information.

The configuration information is used for transmitting an interactive message in a random access procedure, wherein the interactive message includes at least one of the preamble sequence, the second interactive message, the third interactive message, the fourth interactive message, and the fifth interactive message.

Further, as shown in FIG. 2, after the step 102 of performing the random access based on the configuration information, the information transmission method further includes a step 103.

Step 103: receiving uplink transmission data transmitted by the mobile terminal based on the configuration information.

The above step 102 includes sub-steps 1021-1022.

Sub-step 1021: receiving the preamble sequence transmitted by the mobile terminal; and Sub-step 1022: transmitting the second interactive message to the mobile terminal.

In addition, before the sub-step 1021 of receiving the preamble sequence transmitted by the mobile terminal, the above-mentioned step 102 further includes a sub-step 1020.

Sub-step 1020: transmitting correspondence relationship between a grouping identifier of preamble sequences and a configured frequency point to the mobile terminal, so that the mobile terminal selects the preamble sequence based on the correspondence relationship and transmits the preamble sequence.

Here, the base station transmits the correspondence relationship between the grouping identifier of the preamble sequences and the configured frequency point to the mobile terminal, so that the mobile terminal selects the preamble sequence based on the correspondence relationship, a frequency point supported by the mobile terminal and frequency point coverage information of a cell. Assuming that an uplink frequency point supported by the mobile terminal includes the first service frequency point and the second service frequency point, and a location where the mobile terminal is located is covered by only the first service frequency point, preamble sequences are grouped into two groups A and B, a frequency point corresponding to the group A is the first service frequency point, and a frequency point corresponding to the group B is the second service frequency point, then a preamble sequence in the group A is selected and transmitted to the base station.

Further, the step 1021 includes: based on the correspondence relationship between the grouping identifier of the preamble sequences and the configured frequency point and the received preamble sequence transmitted by the mobile terminal, acquiring configuration information of a first target frequency point used for a first subsequent interactive message and/or uplink data transmission, wherein the first subsequent interactive message includes at least one of the third interactive message, the fourth interactive message, and the fifth interactive message.

In this case, the step 1022 includes transmitting the second interactive message in the random access procedure to the mobile terminal, the configuration information of the first target frequency point is carried in the second interactive message or in a Random Access Radio Network Temporary Identifier (RA-RNTI) used by the second interactive message.

The RA-RNTI herein is calculated by a predetermined RA-RNTI calculation formula. The RA-RNTI calculation formula in the LTE system is: RA-RNTI=1+t_id+10*f_id; where t_id is a time resource of a Physical Random Access Channel (PRACH) resource, that is, a number index of a first subframe. f_id is a frequency resource of the PRACH resource, that is, a frequency-domain number within the subframe.

The RA-RNTI calculation formula in a cellular-based Narrowband Internet of Things (NB-IoT) is:

RA-RNTI=1+t_id+10*f_id+60*(SFN_id mod (Wmax/ 10)), where t_id is the time resource of the PRACH resource, that is, the number index of the first subframe. f_id is a frequency resource of the PRACH resource, that is, the frequency-domain number within the subframe, SFN_id is a first radio frame number of the PRACH resource, Wmax is a maximum Random Access Response (RAR) window length (the number of subframes), a value of which is 400 in the NB-IoT.

Based on the above formula, an optional implementation of carrying the configuration information in the RA-RNTI is:

RA-RNTI=1+t_id+10*f_id+N*carrier_ID,
or RA-RNTI=1+N*carrier_ID+N1*t_id+N2*f_id,
or RA-RNTI=1+t_id+N*carrier_ID+N1*f_id.

Where, t_id is the time resource of the PRACH resource, that is, the number index of the first subframe, f_id is the frequency resource of the PRACH resource, that is, the frequency-domain number within the subframe, carrier_ID refers to a corresponding frequency point number (an identifier) in the present disclosure, and parameters N, N1, N2 need to be determined based on the number of time-frequency resources and the number of available frequency points.

In addition, in the 5G NR, the RA-RNTI calculation formula may also carry information of a Synchronization Signal block (a SS block) or a Beam ID. If a beam-related ID is added, then the above formula may also be added with an item corresponding to the beam_ID.

Further, after the sub-step 1022, the step 102 further includes sub-steps 1023-1024.

Sub-step 1023: receiving the third interactive message transmitted by the mobile terminal.

Sub-step 1024: transmitting the fourth interactive message to the mobile terminal.

The sub-step 1023 includes acquiring configuration information of a second target frequency point carried in the third interactive message and used for a second subsequent interactive message and/or uplink data transmission, wherein the second subsequent interactive message includes at least one of the fourth interactive message and the fifth interactive message.

In this case, the sub-step 1024 includes configuring, based on the configuration information of the second target frequency point carried in the third interactive message, configuration information of a third target frequency point used for subsequent uplink data transmission, and transmitting the configuration information of the third target frequency point used for subsequent uplink data transmission to the mobile terminal through the fourth interactive message.

Here, the configuration information of the third target frequency point may be the same as the configuration information of the second target frequency point, or may be different from the configuration information of the second target frequency point.

The information transmission method of the present disclosure transmits to a mobile terminal configuration information of a target frequency point used by the mobile terminal in a random access procedure, wherein the configuration information includes time slot information corresponding to the target frequency point and/or identification information of the target frequency point. The configuration information of the present disclosure carries the time slot information corresponding to the target frequency point and/or the identification information of the target frequency point, so that the mobile terminal may accomplish uplink access at different frequency points in a case that the mobile terminal performs a random access, thereby effectively reducing a probability of access failure or a congestion probability of random access.

Figure 3:
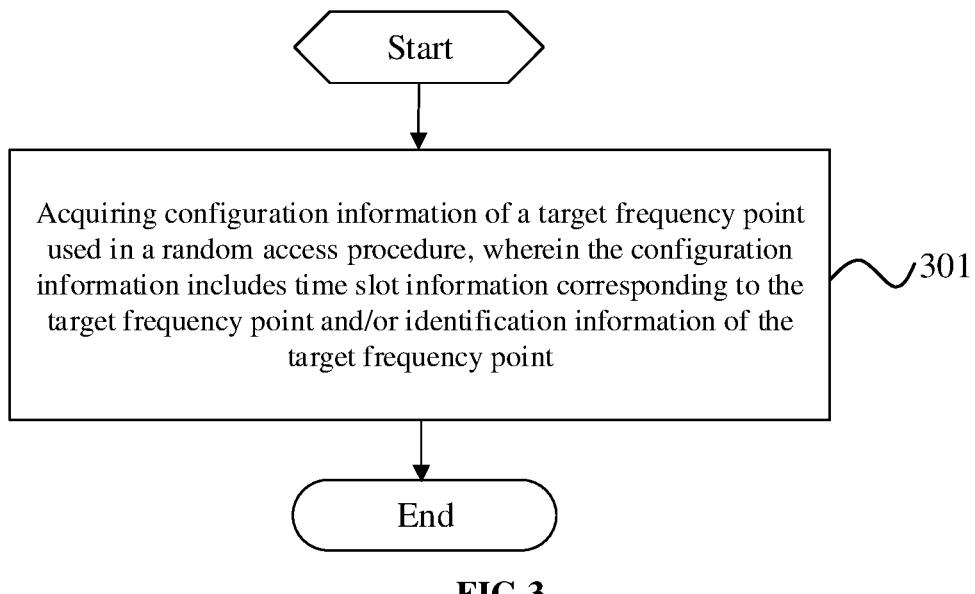
FIG. 3 is an operational flow chart of an information transmission method of the present disclosure.

As shown in FIG. 3, the present disclosure also provides an information transmission method. The information transmission method is applied to a mobile terminal and includes a step 301.

Step 301: acquiring configuration information of a target frequency point used in a random access procedure, wherein the configuration information includes time slot information corresponding to the target frequency point and/or identification information of the target frequency point.

Here, the configuration information of the target frequency point used in the random access procedure is acquired to facilitate the mobile terminal to perform random access and/or uplink data transmission based on the configuration information.

As an optional implementation, the configuration information of the target frequency point used in the random access procedure is acquired through pre-definition.

Specifically, the step 301 includes acquiring the configuration information of the target frequency point through receiving at least one of a dedicated Radio Resource Control (RRC) signaling, a RRC reconfiguration message, a RRC configuration message, a Random Access Channel (RACH) configuration signaling, a system message, and a broadcast message transmitted by a base station.

The time slot information includes a time slot or a part of time slots configured by a base station other than a predetermined time slot, wherein the predetermined time slot is a time slot for downlink reception by the mobile terminal using a downlink service frequency point of the NR communication system.

Further, before the step 301, the information transmission method further includes transmitting capability information of the mobile terminal to the base station, so that the base station may configure, based on the capability information, the target frequency point used by the mobile terminal in the random access procedure, wherein the capability information includes a frequency point supported by the mobile terminal.

The target frequency point includes a first service frequency point of a non-New Radio (NR) communication system and/or a second service frequency point of a NR communication system, wherein a communication system in which the mobile terminal is located is the NR communication system.

Here, the time slot information includes a time slot or a part of time slots configured by a base station other than a predetermined time slot, wherein the predetermined time slot is a time slot for downlink reception by the mobile terminal using a downlink service frequency point of the NR communication system.

The predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

Further, after the above step 301, the information transmission method further includes a step 302.

Step 302: performing random access based on the acquired configuration information.

Specifically, the acquired configuration information is used for transmitting an interactive message in a random access procedure, wherein the interactive message includes at least one of a preamble sequence, a second interactive message, a third interactive message, a fourth interactive message, and a fifth interactive message.

Further, after the above step 302, the information transmission method further includes a step 303.

Step 303: transmitting uplink data based on the acquired configuration information.

Further, the above step 302 includes sub-steps 3021-3022.

Sub-step 3021: transmitting the preamble sequence to the base station through the acquired configuration information.

Sub-step 3022: receiving the second interactive message transmitted by the base station in the random access procedure.

Optionally, before the sub-step 3021, the step 302 further includes receiving correspondence relationship between a grouping identifier of preamble sequences and a configured frequency point transmitted by the base station, and selecting, based on the correspondence relationship, the preamble sequence to be transmitted to the base station.

Optionally, the above step 302 includes: in a case that the second interactive message transmitted by the base station or a Random Access Radio Network Temporary Identifier (RA-RNTI) used in the second interactive message carries the configuration message of the first target frequency point for a first subsequent interactive message and/or the uplink data transmission, transmitting the third interactive message based on the configuration information of the first target frequency point; otherwise transmitting the third interactive message based on the acquired configuration information; wherein the first subsequent interactive message includes at least one of the third interactive message, the fourth interactive message, and the fifth interactive message.

Optionally, the third interactive message carries configuration information of a second target frequency point used for a second subsequent interactive message and/or uplink data transmission; the second subsequent interactive message includes at least one of the fourth interactive message and the fifth interactive message.

Optionally, the step 302 includes receiving the fourth interactive message transmitted by the base station after transmitting the third interactive message.

Optionally, the step 303 includes: in a case that the fourth interactive message transmitted by the base station carries the configuration information of a third target configuration frequency point used for uplink data transmission, transmitting uplink data based on the configuration information of the third target configuration frequency point; in a case that the fourth interactive message transmitted by the base station does not carry the configuration information of the third target configuration frequency point used for uplink data transmission, but the second interactive message transmitted by the base station or the Random Access Radio Network Temporary Identifier (RA-RNTI) used by the second interactive message carries the configuration information of the first target frequency point used for uplink data transmission, transmitting uplink data based on the configuration information of the first target frequency point; and in a case that the fourth interactive message transmitted by the base station does not carry the configuration information of the third target configuration frequency point used for uplink data transmission and the second interactive message transmitted by the base station or the Random Access Radio Network Temporary Identifier (RA-RNTI) used in the second interactive message does not carry the configuration information of the first target frequency point used for uplink data transmission, transmitting uplink data based on the acquired configuration information.

In the present disclosure, a frequency point different from that used in the random access may be configured for subsequent data transmission, and a crosstalk interference or an interference from a second harmonic to which the UE is subjected may also be effectively reduced.

A specific application flow of the present disclosure will be described below.

1. A mobile terminal transmits a first interactive message in a random access procedure (RACH) using a preset frequency point or a frequency point configured by a base station.

The first interactive message is a message 1 (msg. 1), and the frequency point configured by the base station is transmitted to the mobile terminal through a system message (SI) or a dedicated RRC signaling, and the first interactive message is a preamble sequence (preamble).

It should be noted that the interactive messages of the present disclosure refer to interactive messages in the random access procedure.

Optionally, frequency point information is distinguished through grouping preamble sequences, and a preamble sequence selected by the mobile terminal is transmitted to the base station. The base station may select, for the UE based on the group in which the preamble sequence transmitted by the UE is located and the correspondence relationship between a grouping identifier of a preamble sequence and a configured frequency point, resources such as a frequency point resource, a time-frequency domain resource, or a codeword resource used for at least one of the subsequent second interactive message msg. 2 and the third interactive message msg. 3, the fourth interactive message msg. 4, the fifth interactive message msg.5 and a data transmission message.

The second interactive message is a message 2 (msg.2, RAR) in the random access procedure (RACH), and the third interactive message is a message 3 (msg.3) in the random access procedure (RACH), the fourth interactive message is a message 4 (msg.4) in the random access procedure (RACH), and the fifth interactive message is a message 5 (msg.5) in the random access procedure (RACH).

In addition, if this method is adopted (frequency point information is carried by the grouping identifier of the preamble), selection information of the group in which the preamble is located needs to be carried in resource configuration of a Physical Random Access Channel (PRACH).

2. The UE receives the msg. 2 at a preset frequency point or a frequency point configured by the base station.

Here, the msg. 2 message may carry the configuration information corresponding to a frequency point used by at least one of the subsequent msg. 3, the msg. 4, the msg. 5 and the data transmission message.

In addition, in a case that the mobile terminal allows random access to be performed separately at two frequency points, corresponding configuration information, such as an ID of a frequency point, may be carried by a RA-RNTI identifier.

In addition, only the above two steps need to be performed in case of a non-contention-based random access; following two steps are also included in case of a contention-based random access.

3. The UE transmits the msg. 3 at a preset or configured frequency point.

The configured frequency point is specifically a frequency point corresponding to the grouping of the msg. 1, or a frequency point carried by the msg. 2, or a frequency point broadcast through a system message, or a frequency point transmitted through the dedicated RRC signaling.

Optionally, the msg. 3 may carry a frequency-point capability supported by the UE, or configuration information of frequency points required for subsequent transmission (transmission or reception) of the UE.

4. The UE receives the msg. 4 at a preset or configured frequency point.

The configured frequency point is specifically a frequency point corresponding to the grouping of the msg. 1, a frequency point carried by the msg. 2, a frequency point carried by the msg. 2, a frequency point broadcast through a system message, or a frequency point transmitted by the dedicated RRC signaling.

Optionally, the msg. 4 may carry configuration information corresponding to a frequency point used for subsequent uplink transmission configured by the UE.

In the present disclosure, by carrying configuration information of a frequency point in an interactive message, a frequency point used for the interactive message may be dynamically changed, which is more flexible and convenient.

The information transmission method of the present disclosure acquires configuration information of a target frequency point used in a random access procedure, wherein the configuration information includes time slot information corresponding to the target frequency point and/or identification information of the target frequency point, and performs random access based on the configuration information. The mobile terminal of the present disclosure may accomplish uplink access at different frequency points in a case that the mobile terminal performs a random access, thereby effectively reducing a probability of access failure or a congestion probability of random access, and an implementation is more flexible.

Figure 4:
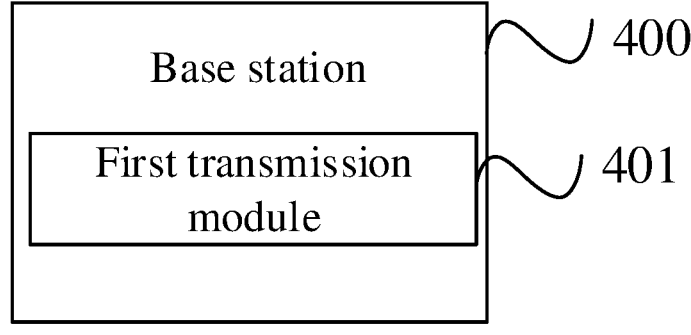
FIG. 4 is a structural block diagram of a base station of the present disclosure.

As shown in FIG. 4, the present disclosure also provides a base station 400. The base station 400 includes a first transmission module 401. The first transmission module 401 is configured to transmit, to a mobile terminal, configuration information of a target frequency point used by the mobile terminal in a random access procedure, wherein the configuration information includes time slot information corresponding to the target frequency point and/or identification information of the target frequency point.

In the base station of the present disclosure, the target frequency point includes a first service frequency point of a non-New Radio (NR) communication system and/or a second service frequency point of a NR communication system, wherein a communication system in which the mobile terminal is located is the NR communication system.

In the base station of the present disclosure, the time slot information includes a time slot or a part of time slots configured by a base station other than a predetermined time slot, wherein the predetermined time slot is a time slot for downlink reception by the mobile terminal using a downlink service frequency point of the NR communication system.

In the base station of the present disclosure, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

The base station of the present disclosure further includes a first acquisition module, wherein the first acquisition module is configured to acquire, through pre-definition, configuration information of the target frequency point used in the random access procedure.

In the base station of the present disclosure, the first transmission module 401 is configured to transmit the configuration information of the target frequency point to the mobile terminal through at least one of a dedicated Radio Resource Control (RRC) signaling, a RRC reconfiguration message, a RRC configuration message, a Random Access Channel (RACH) configuration signaling, a system message, and a broadcast message.

The base station of the present disclosure further includes a second acquisition module and a configuration module. The second acquisition module is configured to acquire capability information reported by the mobile terminal, wherein the capability information includes a frequency point supported by the mobile terminal. The configuration module is configured to configure, based on the capability information, the target frequency point used by the mobile terminal in the random access procedure.

The base station of the present disclosure further includes a first access module configured to perform a random access based on the configuration information.

In the base station of the present disclosure, the first access module is configured to use the configuration information for transmitting an interactive message in a random access procedure, wherein the interactive message includes at least one of the preamble sequence, the second interactive message, the third interactive message, the fourth interactive message, and the fifth interactive message.

The base station of the present disclosure further includes a first reception module, configured to receive, based on the configuration information, uplink transmission data transmitted by the mobile terminal.

In the base station of the present disclosure, the first access module includes a first reception unit and a first transmission unit. The first reception unit is configured to receive a preamble sequence transmitted by the mobile terminal. The first transmission unit is configured to transmit the second interactive message to the mobile terminal.

The base station of the present disclosure further includes a second transmission module configured to transmit correspondence relationship between a grouping identifier of preamble sequences and a configured frequency point to the mobile terminal, so that the mobile terminal selects the preamble sequence based on the correspondence relationship and transmits the preamble sequence.

In the base station of the present disclosure, the first reception unit is configured to: based on the correspondence relationship between the grouping identifier of the preamble sequences and the configured frequency point and the received preamble sequence transmitted by the mobile terminal, acquire configuration information of a first target frequency point used for a first subsequent interactive message and/or uplink data transmission, wherein the first subsequent interactive message includes at least one of the third interactive message, the fourth interactive message, and the fifth interactive message.

In the base station of the present disclosure, the first transmission unit is configured to transmit the second interactive message in the random access procedure to the mobile terminal, the configuration information of the first target frequency point is carried in the second interactive message or in a Random Access Radio Network Temporary Identifier (RA-RNTI) used by the second interactive message.

The base station of the present disclosure further includes a first reception module and a third transmission module. The first reception module is configured to receive the third interactive message transmitted by the mobile terminal. The third transmission module is configured to transmit the fourth interactive message to the mobile terminal.

In the base station of the present disclosure, the first reception module is configured to acquire configuration information of a second target frequency point carried in the third interactive message and used for a second subsequent interactive message and/or uplink data transmission, wherein the second subsequent interactive message includes at least one of the fourth interactive message and the fifth interactive message.

In the base station of the present disclosure, the third transmission module is configured to configure, based on the configuration information of the second target frequency point carried in the third interactive message, configuration information of a third target frequency point used for subsequent uplink data transmission, and transmit, to the mobile terminal through the fourth interactive message, the configuration information of the third target frequency point used for subsequent uplink data transmission.

The base station of the present disclosure transmits, to the mobile terminal, the configuration information of the target frequency point used by the mobile terminal in a random access procedure, wherein the configuration information includes time slot information corresponding to the target frequency point and/or identification information of the target frequency point. The configuration information of the present disclosure carries the time slot information corresponding to the target frequency point and/or the identification information of the target frequency point, so that the mobile terminal may accomplish uplink access at different frequency points in a case that the mobile terminal performs a random access, thereby effectively reducing a probability of access failure or a congestion probability of random access.

Figure 5:
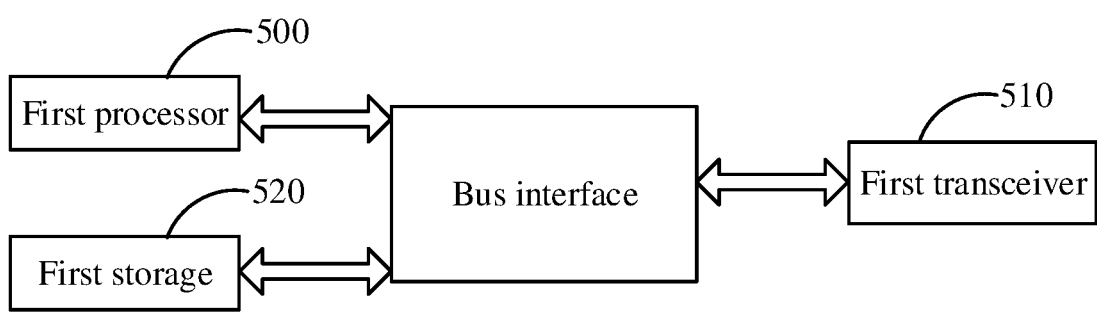
FIG. 5 is a structural block diagram of a base station of the present disclosure.

To better achieve the above objective, as shown in FIG. 5, the present disclosure also provides a base station. The base station includes a first storage 520, a first processor 500, a first transceiver 510, a bus interface and a first computer program stored on the first storage 520 and executable by the first processor 500, wherein the first processor 500 is configured to read the program in the first storage 520 to perform following steps: transmitting, to a mobile terminal, configuration information of a target frequency point used by the mobile terminal in a random access procedure, wherein the configuration information includes time slot information corresponding to the target frequency point and/or identification information of the target frequency point.

In FIG. 5, a bus architecture may include any number of interconnected buses and bridges. Specifically, various circuits including one or more processors represented by the first processor 500 and a storage represented by the first storage 520 are linked together. The bus architecture may also link together a variety of other circuits, such as a peripheral device, a voltage regulator, a power management circuit, and so on, which are well known in the art and, therefore, will not be described further herein. The bus interface provides an interface. The first transceiver 510 may be a plurality of elements including a transmitter and a receiver, for providing a unit for communicating with various other devices over a transmission medium. The first processor 500 is responsible for managing the bus architecture and general processing, and the first storage 520 may store data used by the first processor 500 in performing operations.

Optionally, the target frequency point includes a first service frequency point of a non-New Radio (NR) communication system and/or a second service frequency point of a NR communication system, wherein a communication system in which the mobile terminal is located is the NR communication system.

Optionally, the time slot information includes a time slot or a part of time slots configured by a base station other than a predetermined time slot, wherein the predetermined time slot is a time slot for downlink reception by the mobile terminal using a downlink service frequency point of the NR communication system.

Optionally, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

The first processor 500 is further configured to read the program in the first storage 520 to perform a following step: acquiring, through pre-definition, configuration information of the target frequency point used in the random access procedure.

The first processor 500 is further configured to read the program in the first storage 520 to perform a following step: transmitting the configuration information of the target frequency point to the mobile terminal through at least one of a dedicated Radio Resource Control (RRC) signaling, a RRC reconfiguration message, a RRC configuration message, a Random Access Channel (RACH) configuration signaling, a system message, and a broadcast message.

The first processor 500 is further configured to read the program in the first storage 520 to perform a following step: acquiring capability information reported by the mobile terminal, wherein the capability information includes a frequency point supported by the mobile terminal; and configuring, based on the capability information, the target frequency point used by the mobile terminal in the random access procedure.

The first processor 500 is further configured to read the program in the first storage 520 to perform a following step: performing a random access based on the configuration information.

The first processor 500 is further configured to read the program in the first storage 520 to perform a following step: using the configuration information for transmitting an interactive message in a random access procedure, wherein the interactive message includes at least one of the preamble sequence, the second interactive message, the third interactive message, the fourth interactive message, and the fifth interactive message.

The first processor 500 is further configured to read the program in the first storage 520 to perform a following step: receiving, based on the configuration information, uplink transmission data transmitted by the mobile terminal.

The first processor 500 is further configured to read the program in the first storage 520 to perform following steps: receiving the preamble sequence transmitted by the mobile terminal; and, transmitting the second interactive message to the mobile terminal.

The first processor 500 is further configured to read the program in the first storage 520 to perform a following step: transmitting correspondence relationship between a grouping identifier of preamble sequences and a configured frequency point to the mobile terminal, so that the mobile terminal selects the preamble sequence based on the correspondence relationship and transmits the preamble sequence.

The first processor 500 is further configured to read the program in the first storage 520 to perform the following step: based on the correspondence relationship between the grouping identifier of the preamble sequences and the configured frequency point and the received preamble sequence transmitted by the mobile terminal, acquiring configuration information of a first target frequency point used for a first subsequent interactive message and/or uplink data transmission, wherein the first subsequent interactive message includes at least one of the third interactive message, the fourth interactive message, and the fifth interactive message.

The first processor 500 is further configured to read the program in the first storage 520 to perform a following step: transmitting the second interactive message in the random access procedure to the mobile terminal, wherein the configuration information of the first target frequency point is carried in the second interactive message or in a Random Access Radio Network Temporary Identifier (RA-RNTI) used by the second interactive message.

The first processor 500 is further configured to read the program in the first storage 520 to perform a following step: receiving the third interactive message transmitted by the mobile terminal; and transmitting the fourth interactive message to the mobile terminal.

The first processor 500 is further configured to read the program in the first storage 520 to perform a following step: acquiring configuration information of a second target frequency point carried in the third interactive message and used for a second subsequent interactive message and/or uplink data transmission, wherein the second subsequent interactive message includes at least one of the fourth interactive message and the fifth interactive message.

The first processor 500 is further configured to read the program in the first storage 520 to perform following steps: configuring, based on the configuration information of the second target frequency point carried in the third interactive message, configuration information of a third target frequency point used for subsequent uplink data transmission, and transmitting the configuration information of the third target frequency point used for subsequent uplink data transmission to the mobile terminal through the fourth interactive message.

In some embodiments of the present disclosure, a computer readable storage medium is also provided. The computer readable storage medium includes a first computer program stored thereon, wherein a processor implements following steps in a case that the program is executed by the processor: transmitting, to a mobile terminal, configuration information of a target frequency point used by the mobile terminal in a random access procedure, wherein the configuration information includes time slot information corresponding to the target frequency point and/or identification information of the target frequency point.

In addition, in a case that the first computer program is executed by the processor, the processor may realize all implementations in the above method embodiment, and the detailed description thereof is omitted herein.

The computer readable storage medium in the present disclosure may be a volatile computer readable storage medium or a non-volatile computer readable storage medium.

Figure 6:
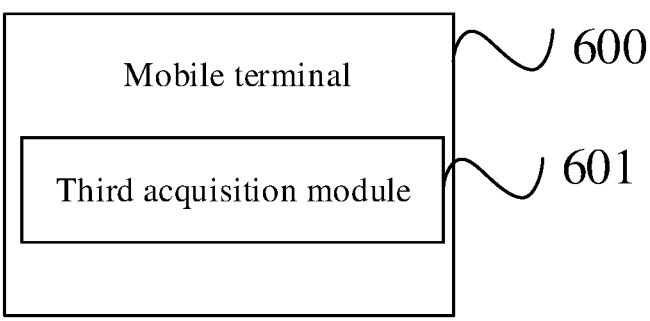
FIG. 6 is a structural block diagram of a mobile terminal of the present disclosure.

As shown in FIG. 6, the present disclosure also provides a mobile terminal 600. The mobile terminal 600 includes a third acquisition module 601, configured to acquire configuration information of a target frequency point used in a random access procedure, wherein the configuration information includes time slot information corresponding to the target frequency point and/or identification information of the target frequency point.

In the mobile terminal of the present disclosure, the target frequency point includes a first service frequency point of a non-New Radio (NR) communication system and/or a second service frequency point of a NR communication system, wherein a communication system in which the mobile terminal is located is the NR communication system.

In the mobile terminal of the present disclosure, the time slot information includes a time slot or a part of time slots configured by a base station other than a predetermined time slot, wherein the predetermined time slot is a time slot for downlink reception by the mobile terminal using a downlink service frequency point of the NR communication system.

In the mobile terminal of the present disclosure, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

In the mobile terminal of the present disclosure, the third acquisition module 601 is configured to acquire, through pre-definition, configuration information of the target frequency point used in the random access procedure.

In the mobile terminal of the present disclosure, the third acquisition module 601 is configured to acquire the configuration information of the target frequency point through receiving at least one of a dedicated Radio Resource Control (RRC) signaling, a RRC reconfiguration message, a RRC configuration message, a Random Access Channel (RACH) configuration signaling, a system message, and a broadcast message transmitted by the base station transmitted by the base station.

The mobile terminal of the present disclosure further includes a fourth transmission module, configured to transmit capability information of the mobile terminal to the base station, so that the base station may configure, based on the capability information, the target frequency point used by the mobile terminal in the random access procedure, wherein the capability information includes a frequency point supported by the mobile terminal.

The mobile terminal of the present disclosure further includes a second access module configured to perform a random access based on the acquired configuration information.

In the mobile terminal of the present disclosure, the second access module is configured to use the acquired configuration information for transmitting an interactive message in a random access procedure, wherein the interactive message includes at least one of a preamble sequence, a second interactive message, a third interactive message, a fourth interactive message, and a fifth interactive message.

The mobile terminal of the present disclosure further includes a transmission module configured to transmit uplink data based on the acquired configuration information.

In the mobile terminal of the present disclosure, the second access module includes a second transmission unit and a second reception unit. The second transmission unit is configured to transmit the preamble sequence to the base station through the acquired configuration information. The second reception unit is configured to receive the second interactive message transmitted by the base station in the random access procedure.

The mobile terminal of the present disclosure further includes a second reception module, configured to receive correspondence relationship between a grouping identifier of preamble sequences and a configured frequency point transmitted by the base station, and select, based on the correspondence relationship, the preamble sequence to be transmitted to the base station.

In the mobile terminal of the present disclosure, the second access module is configured to: in a case that the second interactive message transmitted by the base station or a Random Access Radio Network Temporary Identifier (RA-RNTI) used in the second interactive message carries the configuration message of the first target frequency point for a first subsequent interactive message and/or the uplink data transmission, transmit the third interactive message based on the configuration information of the first target frequency point; otherwise transmit the third interactive message based on the acquired configuration information; wherein the first subsequent interactive message includes at least one of the third interactive message, the fourth interactive message, and the fifth interactive message.

In the mobile terminal of the present disclosure, the third interactive message carries configuration information of a second target frequency point used for a second subsequent interactive message and/or uplink data transmission; the second subsequent interactive message includes at least one of the fourth interactive message and the fifth interactive message.

In the mobile terminal of the present disclosure, the second access module includes a third reception unit configured to receive the fourth interactive message transmitted by the base station after transmitting the third interactive message.

In the mobile terminal of the present disclosure, the transmission module includes a first transmission unit, a second transmission unit, and a third transmission unit. The first transmission unit is configured to: in a case that the fourth interactive message transmitted by the base station carries the configuration information of a third target configuration frequency point used for uplink data transmission, transmit uplink data based on the configuration information of the third target configuration frequency point. The second transmission unit is configured to: in a case that the fourth interactive message transmitted by the base station does not carry the configuration information of the third target configuration frequency point used for uplink data transmission, but the second interactive message transmitted by the base station or the Random Access Radio Network Temporary Identifier (RA-RNTI) used by the second interactive message carries the configuration information of the first target frequency point used for uplink data transmission, transmit uplink data based on the configuration information of the first target frequency point. The third transmission unit is configured to, in a case that the fourth interactive message transmitted by the base station does not carry the configuration information of the third target configuration frequency point used for uplink data transmission and the second interactive message transmitted by the base station or the Random Access Radio Network Temporary Identifier (RA-RNTI) used in the second interactive message does not carry the configuration information of the first target frequency point used for uplink data transmission, transmit uplink data based on the acquired configuration information.

The mobile terminal of the present disclosure acquires configuration information of a target frequency point used in a random access procedure, wherein the configuration information includes time slot information corresponding to the target frequency point and/or identification information of the target frequency point, and performs random access based on the acquired configuration information. The mobile terminal may accomplish an uplink access at different frequency points in a case that the mobile terminal performs a random access, thereby effectively reducing a probability of access failure or a congestion probability of random access, and an implementation is more flexible.

It should be noted that the mobile terminal is a terminal corresponding to the above method embodiment, and all implementations in the above method embodiment are applicable to the embodiments of the mobile terminal, and the same technical effect may be achieved.

Figure 7:
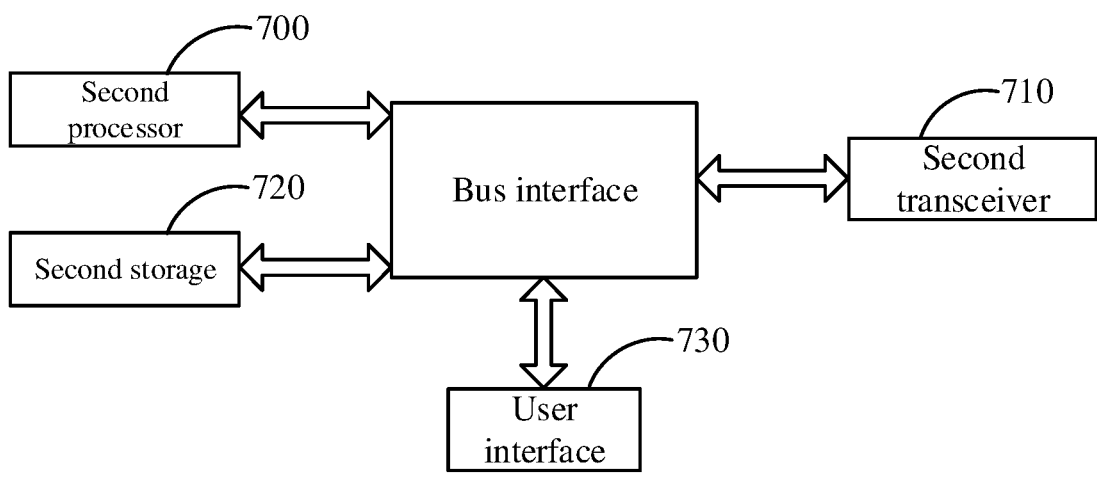
FIG. 7 is a structural block diagram of a mobile terminal of the present disclosure.

To better achieve the above objective, as shown in FIG. 7, the present disclosure also provides a mobile terminal. The mobile terminal includes a second storage 720, a second processor 700, a second transceiver 710, a user interface 730, a bus interface and a second computer program stored on the second storage 720 and executable by the second processor 700, wherein the second processor 700 is configured to read the program in the second storage 720 to perform following steps: acquiring, configuration information of a target frequency point used in a random access procedure, wherein the configuration information includes time slot information corresponding to the target frequency point and/or identification information of the target frequency point.

In FIG. 7, a bus architecture may include any number of interconnected buses and bridges. Specifically, various circuits including one or more processors represented by the second processor 700 and a storage represented by the second storage 720 are linked together. The bus architecture may also link together a variety of other circuits, such as a peripheral device, a voltage regulator, a power management circuit, and so on, which are well known in the art and, therefore, will not be described further herein. The bus interface provides an interface. The second transceiver 710 may be a plurality of elements including a transmitter and a receiver, for providing a unit for communicating with various other devices over a transmission medium. For different user devices, the user interface 730 may also be an interface capable of externally connecting or internally connecting a required device which includes, but is not limited to, a keypad, a display, a speaker, a microphone, a joystick, and the like.

The second processor 700 is responsible for managing the bus architecture and general processing, and the second storage 720 may store data used by the second processor 700 in performing operations.

Optionally, the target frequency point includes a first service frequency point of a non-New Radio (NR) communication system and/or a second service frequency point of a NR communication system, wherein a communication system in which the mobile terminal is located is the NR communication system.

Optionally, the time slot information includes a time slot or a part of time slots configured by a base station other than a predetermined time slot, wherein the predetermined time slot is a time slot for downlink reception by the mobile terminal using a downlink service frequency point of the NR communication system.

Optionally, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

The second processor 700 is further configured to read the program in the second storage 720 to perform a following step: acquiring, through pre-definition, configuration information of the target frequency point used in the random access procedure.

The second processor 700 is further configured to read the program in the second storage 720 to perform a following step: acquiring the configuration information of the target frequency point through receiving at least one of a dedicated Radio Resource Control (RRC) signaling, a RRC reconfiguration message, a RRC configuration message, a Random Access Channel (RACH) configuration signaling, a system message, and a broadcast message transmitted by the base station.

The second processor 700 is further configured to read the program in the second storage 720 to perform a following step: transmitting capability information of the mobile terminal to the base station, so that the base station may configure, based on the capability information, the target frequency point used by the mobile terminal in the random access procedure, wherein the capability information includes a frequency point supported by the mobile terminal.

The second processor 700 is further configured to read the program in the second storage 720 to perform a following step: performing random access based on the acquired configuration information.

The second processor 700 is further configured to read the program in the second storage 720 to perform a following step: using the acquired configuration information for transmitting an interactive message in a random access procedure, wherein the interactive message includes at least one of a preamble sequence, a second interactive message, a third interactive message, a fourth interactive message, and a fifth interactive message.

The second processor 700 is further configured to read the program in the second storage 720 to perform a following step: transmitting uplink data based on the acquired configuration information.

The second processor 700 is further configured to read the program in the second storage 720 to perform following steps: transmitting the preamble sequence to the base station through the acquired configuration information; receiving the second interactive message transmitted by the base station in the random access procedure.

The second processor 700 is further configured to read the program in the second storage 720 to perform following steps: receiving correspondence relationship between a grouping identifier of preamble sequences and a configured frequency point transmitted by the base station, and selecting, based on the correspondence relationship, the preamble sequence to be transmitted to the base station.

The second processor 700 is further configured to read the program in the second storage 720 to perform the following steps: in a case that the second interactive message transmitted by the base station or a Random Access Radio Network Temporary Identifier (RA-RNTI) used in the second interactive message carries the configuration message of the first target frequency point for a first subsequent interactive message and/or the uplink data transmission, transmitting the third interactive message based on the configuration information of the first target frequency point; otherwise transmitting the third interactive message based on the acquired configuration information; wherein the first subsequent interactive message includes at least one of the third interactive message, the fourth interactive message, and the fifth interactive message.

Optionally, the third interactive message carries configuration information of a second target frequency point used for a second subsequent interactive message and/or uplink data transmission; the second subsequent interactive message includes at least one of the fourth interactive message and the fifth interactive message.

The second processor 700 is further configured to read the program in the second storage 720 to perform a following step: receiving the fourth interactive message transmitted by the base station after transmitting the third interactive message.

The second processor 700 is further configured to read the program in the second storage 720 to perform following steps: in a case that the fourth interactive message transmitted by the base station carries the configuration information of a third target configuration frequency point used for uplink data transmission, transmitting uplink data based on the configuration information of the third target configuration frequency point; in a case that the fourth interactive message transmitted by the base station does not carry the configuration information of the third target configuration frequency point used for uplink data transmission, but the second interactive message transmitted by the base station or the Random Access Radio Network Temporary Identifier (RA-RNTI) used by the second interactive message carries the configuration information of the first target frequency point used for uplink data transmission, transmitting uplink data based on the configuration information of the first target frequency point; and in a case that the fourth interactive message transmitted by the base station does not carry the configuration information of the third target configuration frequency point used for uplink data transmission and the second interactive message transmitted by the base station or the Random Access Radio Network Temporary Identifier (RA-RNTI) used in the second interactive message does not carry the configuration information of the first target frequency point used for uplink data transmission, transmitting uplink data based on the acquired configuration information.

In some embodiments of the present disclosure, a computer readable storage medium is also provided. The computer readable storage medium includes a second computer program stored thereon, wherein a processor implement the following steps in a case that the second computer program is executed by the processor: acquiring configuration information of a target frequency point used in a random access procedure, wherein the configuration information includes time slot information corresponding to the target frequency point and/or identification information of the target frequency point.

It should be noted that, in a case that the second computer program is executed by the processor, the processor may implement all implementations in the above method embodiments which will not be described here.

In the present disclosure, the computer readable storage medium may be a volatile computer readable storage medium or a non-volatile computer readable storage medium.

Figure 8:
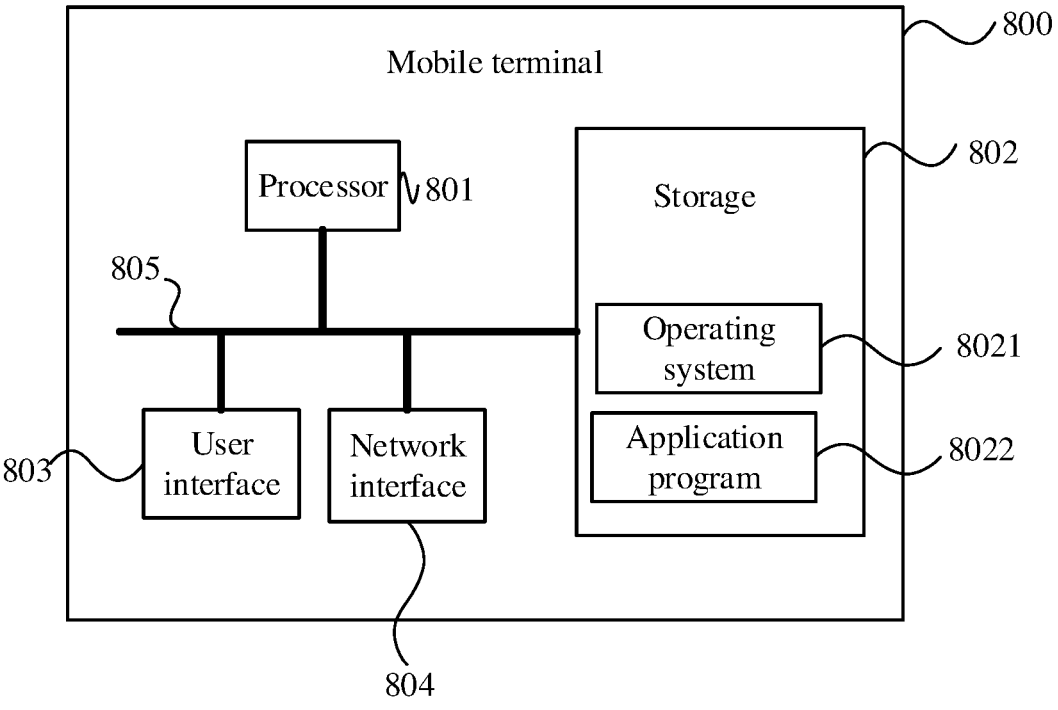
FIG. 8 is a structural block diagram of a mobile terminal of the present disclosure.

As shown in FIG. 8, FIG. 8 is another structural block diagram of the mobile terminal of the present disclosure. The mobile terminal 800 shown in FIG. 8 includes at least one processor 801, a storage 802, at least one network interface 804, and another user interface 803. Various components in the mobile terminal 800 are coupled together by a bus system 805. It will be appreciated that the bus system 805 is used to enable connection communication among these components. The bus system 805 includes, in addition to a data bus, a power bus, a control bus, and a status signal bus. However, for clarity of illustration, various buses are designated as the bus system 805 in FIG. 8.

The user interface 803 may include a display, a keyboard, or a pointing device (e.g., a mouse, a trackball, a touch pad, or a touch screen, etc.).

It is understood that the storage 802 in the present disclosure may be a volatile storage or a non-volatile storage, or may include both volatile and non-volatile storages. The non-volatile storage may be a Read-Only Memory (ROM), a Programmable ROM (PROM), an Erasable PROM (EPROM), an Electrically EPROM (EEPROM), or a flash memory. The volatile storage may be a Random Access Memory (RAM) serving as an external cache. By way of example, but not limitation, many forms of RAMs may be used, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DRRAM). The storage 802 in the systems and methods described herein is intended to include, but is not limited to, these and any other suitable types of storages.

In some embodiments, the storage 802 stores following elements, executable modules or data structures, or a subset thereof, or an extended set thereof: an operating system 8021 and an application program 8022.

The operating system 8021 includes various system programs, such as a framework layer, a core library layer, a driver layer and the like, for implementing various basic services and processing hardware-based tasks. The application program 8022 includes various application programs such as a Media Player, a Browser, and the like, and is used to implement various application services. A program for implementing the method of the present disclosure may be included in the application program 8022.

In an embodiment of the present disclosure, by invoking a program or an instruction stored in the storage 802 which may specifically be a program or an instruction stored in the application program 8022, the processor 801 is configured to acquire configuration information of a target frequency point used in a random access procedure, wherein the configuration information includes time slot information corresponding to the target frequency point and/or identification information of the target frequency point.

Optionally, the target frequency point includes a first service frequency point of a non-New Radio (NR) communication system and/or a second service frequency point of a NR communication system, wherein a communication system in which the mobile terminal is located is the NR communication system.

Optionally, the time slot information includes a time slot or a part of time slots configured by a base station other than a predetermined time slot, wherein the predetermined time slot is a time slot for downlink reception by the mobile terminal using a downlink service frequency point of the NR communication system.

Optionally, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

The processor 801 is further configured to read the program in the second storage 720 to perform a following step: acquiring, through pre-definition, configuration information of the target frequency point used in the random access procedure.

The processor 801 is further configured to read the program in the second storage 720 to perform a following step: acquiring the configuration information of the target frequency point through receiving at least one of a dedicated Radio Resource Control (RRC) signaling, a RRC reconfiguration message, a RRC configuration message, a RACH configuration signaling, a system message, and a broadcast message transmitted by the base station.

The processor 801 is further configured to read the program in the second storage 720 to perform a following step: transmitting capability information of the mobile terminal to the base station, so that the base station may configure, based on the capability information, the target frequency point used by the mobile terminal in the random access procedure, wherein the capability information includes a frequency point supported by the mobile terminal.

The processor 801 is further configured to read the program in the second storage 720 to perform a following step: performing random access based on the acquired configuration information.

The processor 801 is further configured to read the program in the second storage 720 to perform a following step: using the acquired configuration information for transmitting an interactive message in a random access procedure, wherein the interactive message includes at least one of a preamble sequence, a second interactive message, a third interactive message, a fourth interactive message, and a fifth interactive message.

The processor 801 is further configured to read the program in the second storage 720 to perform a following step: transmitting uplink data based on the acquired configuration information.

The processor 801 is further configured to read the program in the second storage 720 to perform following steps: transmitting the preamble sequence to the base station through the acquired configuration information; receiving the second interactive message transmitted by the base station in the random access procedure.

The processor 801 is further configured to read the program in the second storage 720 to perform following steps: receiving correspondence relationship between a grouping identifier of preamble sequences and a configured frequency point transmitted by the base station, and selecting, based on the correspondence relationship, the preamble sequence to be transmitted to the base station.

The processor 801 is further configured to read the program in the second storage 720 to perform the following steps: in a case that the second interactive message transmitted by the base station or a Random Access Radio Network Temporary Identifier (RA-RNTI) used in the second interactive message carries the configuration message of the first target frequency point for a first subsequent interactive message and/or the uplink data transmission, transmitting the third interactive message based on the configuration information of the first target frequency point; otherwise transmitting the third interactive message based on the acquired configuration information; wherein the first subsequent interactive message includes at least one of the third interactive message, the fourth interactive message, and the fifth interactive message.

Optionally, the third interactive message carries configuration information of a second target frequency point used for a second subsequent interactive message and/or uplink data transmission; the second subsequent interactive message includes at least one of the fourth interactive message and the fifth interactive message.

The processor 801 is further configured to read the program in the second storage 720 to perform a following step: receiving the fourth interactive message transmitted by the base station after transmitting the third interactive message.

The processor 801 is further configured to read the program in the second storage 720 to perform following steps: in a case that the fourth interactive message transmitted by the base station carries the configuration information of a third target configuration frequency point used for uplink data transmission, transmitting uplink data based on the configuration information of the third target configuration frequency point; in a case that the fourth interactive message transmitted by the base station does not carry the configuration information of the third target configuration frequency point used for uplink data transmission, but the second interactive message transmitted by the base station or the Random Access Radio Network Temporary Identifier (RA-RNTI) used by the second interactive message carries the configuration information of the first target frequency point used for uplink data transmission, transmitting uplink data based on the configuration information of the first target frequency point; and in a case that the fourth interactive message transmitted by the base station does not carry the configuration information of the third target configuration frequency point used for uplink data transmission and the second interactive message transmitted by the base station or the Random Access Radio Network Temporary Identifier (RA-RNTI) used in the second interactive message does not carry the configuration information of the first target frequency point used for uplink data transmission, transmitting uplink data based on the acquired configuration information.

In the mobile terminal 800 of the present disclosure, the processor 801 is configured to acquire configuration information of a target frequency point used in a random access procedure, wherein the configuration information includes time slot information corresponding to the target frequency point and/or identification information of the target frequency point, and perform random access based on the configuration information. The mobile terminal of the present disclosure may accomplish uplink access at different frequency points in a case that the mobile terminal performs a random access, thereby effectively reducing a probability of access failure or a congestion probability of random access, and an implementation is more flexible.

The mobile terminal of the present disclosure may be, for example, a mobile phone, a tablet computer, a Personal Digital Assistant (PDA), or a vehicle-mounted computer or the like.

The mobile terminal 800 may implement various processes implemented by the terminal in the foregoing embodiments, and in order to avoid repetition, the detailed description thereof is omitted here.

The methods disclosed in the present disclosure described above may be applied in, or implemented by, the processor 801. The processor 801 may be an integrated circuit chip with a signal processing capability. In implementation, the steps of the method described above may be accomplished by integrated logic circuitry in hardware in the processor 801 or by instructions in a form of software. The processor 801 may be a general-purpose processor, a Digital Signal Processor (DSP), an Application Specific Integrated Circuit (ASIC), a Field Programmable Gate Arrays (FPGAs) or other programmable logic devices, discrete gates or transistor logic devices, discrete hardware components. The methods, steps, and logic blocks disclosed in the present disclosure may be implemented or performed. The general purpose processor may be a microprocessor or the processor may be any conventional processor or the like. The steps of the method disclosed in connection with the present disclosure may be embodied directly through execution by a hardware decoding processor, or be accomplished by a combination of hardware and software modules in a decoding processor. The software module may be located in a storage medium mature in the art such as a random access memory, a flash storage, a read only storage, a programmable read only storage, or an electrically erasable programmable storage, a register, etc. The storage medium is located in the storage 802 and the processor 801 reads information in the storage 802 and performs the steps of the method described above in conjunction with hardware of the processor 801.

It will be appreciated that the embodiments described herein may be implemented in hardware, software, firmware, middleware, microcode, or a combination thereof. For a hardware implementation, the processing unit may be implemented in one or more Application Specific Integrated Circuits (ASICs), a Digital Signal Processing (DSP), a DSP Device (DSPD), a Programmable Logic Device (PLD), a Field-Programmable Gate Array (FPGA), a general purpose processor, a controller, a microcontroller, a microprocessor, other electronic units for performing functions described herein, or combinations thereof.

For a software implementation, techniques described herein may be implemented by modules (e.g., processes, functions, etc.) that perform the functions described herein. A software code may be stored in a storage and executed by a processor. The storage may be implemented in the processor or external to the processor.

The present disclosure transmits, to a mobile terminal, configuration information of a target frequency point used in a random access procedure, wherein the configuration information includes time slot information corresponding to the target frequency point and/or identification information of the target frequency point. The configuration information of the present disclosure carries the time slot information corresponding to the target frequency point and/or the identification information of the target frequency point, so that the mobile terminal may accomplish uplink access at different frequency points in a case that the mobile terminal performs a random access, thereby effectively reducing a probability of access failure or a congestion probability of random access.

Figure 9:
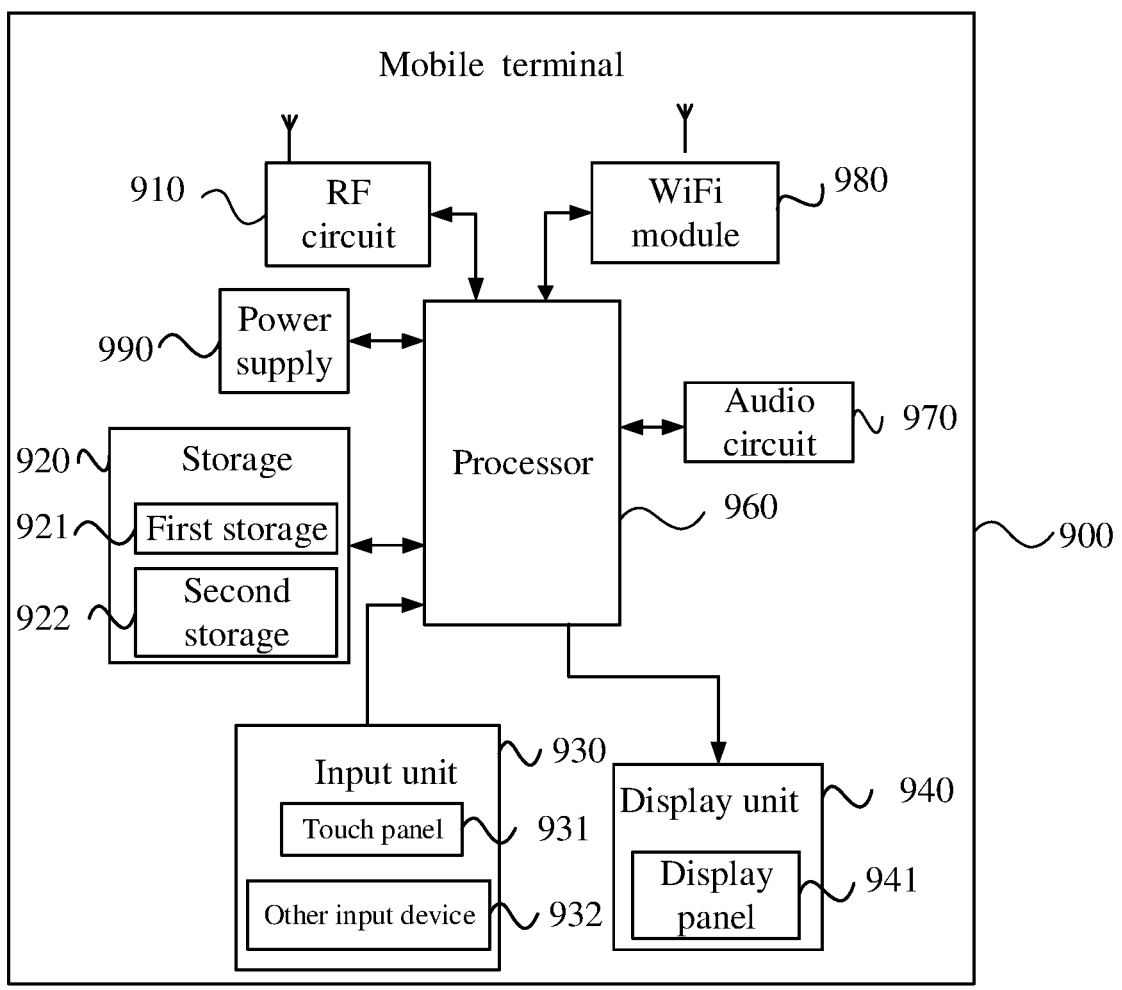
FIG. 9 is a structural block diagram of a mobile terminal of the present disclosure.

FIG. 9 is a structural block diagram of a mobile terminal of the present disclosure. The mobile terminal 900 shown in FIG. 9 includes a Radio Frequency (RF) circuit 910, a storage 920, an input unit 930, a display unit 940, a processor 960, an audio circuit 970, a WiFi (Wireless Fidelity) module 9100 and a power supply 990.

Wherein, the input unit 930 may be configured to receive digital or character information inputted by a user and generate a signal input related to a user settings and a function control of the mobile terminal 900. Specifically, in the present disclosure, the input unit 930 may include a touch panel 931. The touch panel 931, also referred to as a touch screen, may collect user touch operations on or near it (such as user operations on the touch panel 931 using any suitable object or accessory such as a finger, stylus, etc.), and drive a corresponding connected device according to a preset program. Optionally, the touch panel 931 may include two parts, a touch detection device and a touch controller. Wherein the touch detection device detects a touch orientation of the user, detects a signal caused by the touch operation, and transmits the signal to the touch controller. The touch controller receives touch information from the touch detection device, converts it into contact coordinates, transmits the contact coordinates to the processor 960, and may receive and execute commands from the processor 960. In addition, the touch panel 931 may be implemented as various types such as a resistive type, a capacitive type, an infrared ray type, and a surface acoustic wave type. In addition to the touch panel 931, the input unit 930 may include other input devices 932 that may include, but are not limited to, one or more of a physical keyboard, a function key (such as volume control keys, switch keys, etc.), a trackball, a mouse, a joystick, or the like.

The display unit 940 may be configured to display information inputted by a user or information provided to the user and various menu interfaces of the mobile terminal 900. The display unit 940 may include a display panel 941, optionally an LCD or an Organic Light-Emitting Diode (OLED) or the like may be used to configure the display panel 941.

It should be noted that the touch panel 931 may cover the display panel 941 to form a touch display screen. When the touch display screen detects a touch operation thereon or in the vicinity thereof, information of the touch operation is transmitted to the processor 960 to determine the type of a touch event. The processor 960 then provides a corresponding visual output on the touch display screen based on the type of the touch event.

The touch display screen includes an application interface display area and a common control display area. An arrangement of the application interface display area and the common control display area is not limited, and may be an arrangement in which the two display areas may be distinguished such as an up-down arrangement, a left-right arrangement, and so on. The application interface display area may be used to display an interface of an application. Each interface may contain an icon of at least one application and/or interface elements such as widget desktop controls. The application interface display area may also be an empty interface that does not contain any content. The common control display area is used to display control elements with a high utilization rate, such as application icons including a setting button, an interface number, a scroll bar, a phone book icon and so on.

The processor 960 is a control center of the mobile terminal 900 and connects various parts of an entirety of a handset using various interfaces and lines, and by running or executing software programs and/or modules stored in the first storage 921 and invoking data stored in the second storage 922, performs various functions of the mobile terminal 900 and processes data, thereby performing an overall monitoring of the mobile terminal 900. Optionally, the processor 960 may include one or more processing units.

In the present disclosure, by running or executing the software programs and/or the modules stored in the first storage 921 and invoking data stored in the second storage 922, the processor 960 is configured to acquire, configuration information of a target frequency point used in a random access procedure, wherein the configuration information includes time slot information corresponding to the target frequency point and/or identification information of the target frequency point.

The target frequency point includes a first service frequency point of a non-New Radio (NR) communication system and/or a second service frequency point of a NR communication system, wherein a communication system in which the mobile terminal is located is the NR communication system.

Optionally, the time slot information includes a time slot or a part of time slots configured by a base station other than a predetermined time slot, wherein the predetermined time slot is a time slot for downlink reception by the mobile terminal using a downlink service frequency point of the NR communication system.

Optionally, the predetermined time slot includes a time slot for downlink reception using a downlink service frequency point in a connected state and a time slot for downlink reception using a downlink service frequency point in an idle state. The time slot for downlink reception using a downlink service frequency point in the connected state includes a time slot for receiving downlink control information, a time slot for receiving downlink data, a time slot for receiving a broadcast message, a time slot for receiving a paging message, and a time slot for receiving reference information; the time slot for downlink reception using a downlink service frequency point in the idle state includes a time slot for receiving downlink control information, a time slot for receiving a paging message, and a time slot for receiving reference information.

By running or executing the software programs and/or the modules stored in the first storage 921 and invoking data stored in the second storage 922, the processor 960 is further configured to acquire, through pre-definition, configuration information of the target frequency point used in the random access procedure.

By running or executing the software programs and/or the modules stored in the first storage 921 and invoking data stored in the second storage 922, the processor 960 is further configured to: acquire the configuration information of the target frequency point through receiving at least one of a dedicated Radio Resource Control (RRC) signaling, a RRC reconfiguration message, a RRC configuration message, a RACH configuration signaling, a system message, and a broadcast message transmitted by a base station.

By running or executing the software programs and/or the modules stored in the first storage 921 and invoking data stored in the second storage 922, the processor 960 is further configured to: transmit capability information of the mobile terminal to the base station, so that the base station may configure, based on the capability information, the target frequency point used by the mobile terminal in the random access procedure, wherein the capability information includes a frequency point supported by the mobile terminal.

By running or executing the software programs and/or the modules stored in the first storage 921 and invoking data stored in the second storage 922, the processor 960 is further configured to: perform random access based on the acquired configuration information.

By running or executing the software programs and/or the modules stored in the first storage 921 and invoking data stored in the second storage 922, the processor 960 is further configured to: use the acquired configuration information for transmitting an interactive message in a random access procedure, wherein the interactive message includes at least one of a preamble sequence, a second interactive message, a third interactive message, a fourth interactive message, and a fifth interactive message.

By running or executing the software programs and/or the modules stored in the first storage 921 and invoking data stored in the second storage 922, the processor 960 is further configured to: transmit uplink data based on the acquired configuration information.

By running or executing the software programs and/or the modules stored in the first storage 921 and invoking data stored in the second storage 922, the processor 960 is further configured to: transmit the preamble sequence to the base station through the acquired configuration information; and receive the second interactive message transmitted by the base station in the random access procedure.

By running or executing the software programs and/or the modules stored in the first storage 921 and invoking data stored in the second storage 922, the processor 960 is further configured to: receive correspondence relationship between a grouping identifier of preamble sequences and a configured frequency point transmitted by the base station, and select, based on the correspondence relationship, the preamble sequence to be transmitted to the base station.

By running or executing the software programs and/or the modules stored in the first storage 921 and invoking data stored in the second storage 922, the processor 960 is further configured to: in a case that the second interactive message transmitted by the base station or a Random Access Radio Network Temporary Identifier (RA-RNTI) used in the second interactive message carries the configuration message of the first target frequency point for a first subsequent interactive message and/or the uplink data transmission, transmit the third interactive message based on the configuration information of the first target frequency point; otherwise transmit the third interactive message based on the acquired configuration information; wherein the first subsequent interactive message includes at least one of the third interactive message, the fourth interactive message, and the fifth interactive message.

Optionally, the third interactive message carries configuration information of a second target frequency point used for a second subsequent interactive message and/or uplink data transmission; the second subsequent interactive message includes at least one of the fourth interactive message and the fifth interactive message.

By running or executing the software programs and/or the modules stored in the first storage 921 and invoking data stored in the second storage 922, the processor 960 is further configured to: receive the fourth interactive message transmitted by the base station after transmitting the third interactive message.

By running or executing the software programs and/or the modules stored in the first storage 921 and invoking data stored in the second storage 922, the processor 960 is further configured to: in a case that the fourth interactive message transmitted by the base station carries the configuration information of a third target configuration frequency point used for uplink data transmission, transmit uplink data based on the configuration information of the third target configuration frequency point; in a case that the fourth interactive message transmitted by the base station does not carry the configuration information of the third target configuration frequency point used for uplink data transmission, but the second interactive message transmitted by the base station or the Random Access Radio Network Temporary Identifier (RA-RNTI) used by the second interactive message carries the configuration information of the first target frequency point used for uplink data transmission, transmit uplink data based on the configuration information of the first target frequency point; and in a case that the fourth interactive message transmitted by the base station does not carry the configuration information of the third target configuration frequency point used for uplink data transmission and the second interactive message transmitted by the base station or the Random Access Radio Network Temporary Identifier (RA-RNTI) used in the second interactive message does not carry the configuration information of the first target frequency point used for uplink data transmission, transmit uplink data based on the acquired configuration information.

The mobile terminal of the present disclosure may be, for example, a mobile phone, a tablet computer, a Personal Digital Assistant (PDA), or a vehicle-mounted computer or the like.

The mobile terminal 900 may implement various processes implemented by the terminal in the foregoing embodiments, and in order to avoid repetition, the detailed description thereof is omitted here.

In the mobile terminal 900 of the present disclosure, the processor 960 is configured to acquire configuration information of a target frequency point used in a random access procedure, wherein the configuration information includes time slot information corresponding to the target frequency point and/or identification information of the target frequency point, and perform random access based on the configuration information. The mobile terminal of the present disclosure may accomplish uplink access at different frequency points in a case that the mobile terminal performs a random access, thereby effectively reducing a probability of access failure or a congestion probability of random access, and an implementation is more flexible.

Those of ordinary skill in the art will appreciate that elements and algorithm steps of examples described in connection with the embodiments disclosed herein may be implemented in electronic hardware, or a combination of computer software and electronic hardware. Whether functions are executed in hardware or are executed in software depends on specific applications and design constraints of the technical solution. One skilled in the art may use different methods to implement the described functions for each particular application, but such implementation should not be considered to go beyond the scope of the present disclosure.

Those of ordinary skill in the art will appreciate that elements and algorithm steps of examples described in connection with the embodiments disclosed herein may be implemented in electronic hardware, or a combination of computer software and electronic hardware. Whether functions are executed in hardware or are executed in software depends on specific applications and design constraints of the technical solution. One skilled in the art may use different methods to implement the described functions for each particular application, but such implementation should not be considered to go beyond the scope of the present disclosure.

Those skilled in the art may clearly understand that, for convenience and brevity of description, specific working processes of the above-described systems, devices and units may be obtained by referring to corresponding processes in the foregoing process embodiments, and will not be described in detail herein.

In the embodiments provided herein, it should be understood that the disclosed apparatus and methods may be implemented in other ways. For example, the product embodiments described above are merely illustrative, for example, a division to modules is only a logical functional division, and additional divisions may exist in actual conditions. For example, multiple elements or components may be combined or may be integrated into another system, or some features may be ignored or not performed. Optionally, a coupling or a direct coupling or a communication connection between modules or elements being shown or discussed may be an indirect coupling or a communication connection through some interfaces, devices or units, and the coupling or a direct coupling or a communication connection may be in an electrical, a mechanical or other forms.

The elements described as separate elements may or may not be physically separated, and elements displayed as units may or may not be physical elements, i.e. may be located in one place or may be distributed over a plurality of network elements. Some or all of the units therein may be selected according to actual needs to achieve the purpose of the solution of the present disclosure.

In addition, functional units in the embodiments of that present disclosure may be integrated in one processing unit, may be physically exist separately from each other, or two or more of the functional units may be integrated in one unit.

The functions, if implemented in a form of software functional units and sold or used as separate products, may be stored in a computer readable storage medium. Based on this understanding, an essence of the technical solution of the present disclosure, or a part of the technical solution of the present disclosure contributing to the prior art, or a part of the technical solution may be embodied in a form of a software product stored in a storage medium. The storage medium includes a number of instructions used to cause a computer device (which may be a personal computer, a server, or a network device, etc.) to perform all or parts of the steps of the method described in various embodiments of the present disclosure. The aforementioned storage medium includes various medium capable of storing program codes, such as a USB disk, a removable hard disk, a ROM, a RAM, a magnetic disk, or a compact disc.

One of ordinary skills in that art may appreciate that all or a part of flows in the method for implementing the above embodiments may be accomplished by controlling relevant hardware by a computer program. The computer program may be stored in a computer readable storage medium. The program, when being executed, may include flows of the methods described in the above embodiments. The storage medium may be a magnetic disk, an optical disk, a Read-Only Memory (ROM), or a Random Access Memory (RAM), etc.

What is described above are optional embodiments of the present disclosure, are not used to limit the present disclosure. Any modification, equivalent replacement, and improvement made within the spirit and principle of the present disclosure is also included in the scope of the present disclosure.

What is claimed is:

1. An information transmission method, applied to a base station and comprising:

transmitting, to a mobile terminal, configuration information of a target frequency point used by the mobile terminal in a random access procedure, wherein the configuration information comprises time slot information corresponding to the target frequency point and/or identification information of the target frequency point;

wherein after the step of transmitting, to the mobile terminal, configuration information of the target frequency point used by the mobile terminal in the random access procedure, the method further comprises:

performing a random access based on the configuration information;

wherein the step of performing the random access based on the configuration information, comprises:

using the configuration information for transmitting a preamble sequence in the random access procedure;

wherein the step of performing the random access based on the configuration information, comprises:

receiving a preamble sequence transmitted by the mobile terminal; and transmitting a second interactive message to the mobile terminal;

wherein the step of transmitting the second interactive message to the mobile terminal, comprises:

transmitting the second interactive message in the random access procedure to the mobile terminal, configuration information of a first target frequency point is carried in a Random Access Radio Network Temporary Identifier (RA-RNTI) used by the second interactive message;

after the step of transmitting the second interactive message to the mobile terminal, the method further comprises:

receiving a third interactive message transmitted by the mobile terminal;

wherein the step of transmitting, to the mobile terminal, configuration information of a target frequency point used by the mobile terminal in the random access procedure, comprises:

transmitting the configuration information of the target frequency point to the mobile terminal through at least one of a Radio Resource Control (RRC) reconfiguration message, a system message, and a broadcast message.

2. The information transmission method according to claim 1, wherein the target frequency point comprises a first service frequency point and/or a second service frequency point.

3. The information transmission method according to claim 1, wherein the time slot information comprises a time slot or a part of time slots configured by a base station other than a predetermined time slot, wherein the predetermined time slot is a time slot for downlink reception by the mobile terminal using a downlink service frequency point of the NR communication system;

wherein the predetermined time slot comprises:

a time slot for downlink reception using a downlink service frequency point in a connected state and a time slot for downlink reception using a downlink service frequency point in an idle state;

wherein the time slot for downlink reception using the downlink service frequency point in the connected state comprises a time slot for receiving downlink control information, a time slot for receiving downlink data, a time slot for receiving a broadcast message, a time slot for receiving a paging message, and a time slot for receiving reference information; the time slot for downlink reception using the downlink service frequency point in the idle state comprises a time slot for receiving downlink control information, a time slot for receiving a paging message, and a time slot for receiving reference information.

4. The information transmission method according to claim 1, wherein before the step of transmitting, to the mobile terminal, configuration information of a target frequency point used by the mobile terminal in the random access procedure, the method further comprises:

acquiring, through pre-definition, configuration information of the target frequency point used in the random access procedure.

5. The information transmission method according to claim 1, wherein before the step of transmitting, to the mobile terminal, configuration information of the target frequency point used by the mobile terminal in the random access procedure, the method further comprises:

acquiring capability information reported by the mobile terminal, wherein the capability information comprises a frequency point supported by the mobile terminal; and configuring, based on the capability information, the target frequency point used by the mobile terminal in the random access procedure.

6. The information transmission method according to claim 1, wherein after the step of performing the random access based on the configuration information, the method further comprises:

receiving, based on the configuration information, uplink transmission data transmitted by the mobile terminal.

7. The information transmission method according to claim 1, wherein before the step of receiving the preamble sequence transmitted by the mobile terminal, the method further comprises:

transmitting correspondence relationship between a grouping identifier of preamble sequences and a configured frequency point to the mobile terminal, wherein the correspondence relationship is used to enable the mobile terminal to select the preamble sequence based on the correspondence relationship and transmit the preamble sequence.

8. The information transmission method according to claim 1, wherein the step of receiving the preamble sequence transmitted by the mobile terminal, comprises:

acquiring, based on the correspondence relationship between the grouping identifier of the preamble sequences and the configured frequency point and the received preamble sequence transmitted by the mobile terminal, the configuration information of the first target frequency point used for a first subsequent interactive message and/or uplink data transmission, wherein the first subsequent interactive message comprises at least one of a third interactive message, a fourth interactive message, and a fifth interactive message.

9. The information transmission method according to claim 1, wherein after the step of receiving the third interactive message transmitted by the mobile terminal, the method further comprises:

transmitting a fourth interactive message to the mobile terminal.

10. The information transmission method according to claim 9, wherein the step of receiving the third interactive message transmitted by the mobile terminal comprises:

acquiring configuration information of a second target frequency point carried in the third interactive message and used for a second subsequent interactive message and/or uplink data transmission, wherein the second subsequent interactive message comprises at least one of the fourth interactive message and a fifth interactive message;

wherein the step of transmitting the fourth interactive message to the mobile terminal comprises:

configuring, based on the configuration information of the second target frequency point carried in the third interactive message, configuration information of a third target frequency point used for subsequent uplink data transmission, and transmitting the configuration information of the third target frequency point used for subsequent uplink data transmission to the mobile terminal through the fourth interactive message.

11. An information transmission method, applied to a mobile terminal and comprising:

acquiring configuration information of a target frequency point used in a random access procedure, wherein the configuration information comprises time slot information corresponding to the target frequency point and/or identification information of the target frequency point;

wherein after the step of acquiring configuration information of the target frequency point used in the random access procedure, the method further comprises:

performing random access based on the acquired configuration information;

the step of performing the random access based on the acquired configuration information, comprises:

using the acquired configuration information for transmitting a preamble sequence in a random access procedure;

wherein the step of performing the random access based on the acquired configuration information further comprises:

in a case that a Random Access Radio Network Temporary Identifier (RA-RNTI) used in a second interactive message carries configuration message of a first target frequency point for uplink data transmission, transmitting a third interactive message based on the configuration information of the first target frequency point; otherwise transmitting the third interactive message based on the acquired configuration information;

wherein the step of acquiring configuration information of the target frequency point used in the random access procedure comprises:

acquiring configuration information of the target frequency point through receiving at least one of a Radio Resource Control (RRC) reconfiguration message, a system message, and a broadcast message.

12. The information transmission method according to claim 11, wherein the target frequency point comprises a first service frequency point and/or a second service frequency point.

13. The information transmission method according to claim 11, wherein the time slot information comprises a time slot or a part of time slots configured by a base station other than a predetermined time slot, wherein the predetermined time slot is a time slot for downlink reception by the mobile terminal using a downlink service frequency point of the NR communication system;

wherein the predetermined time slot comprises a time slot for downlink reception using a downlink service frequency point in a connected state and a time slot for downlink reception using a downlink service frequency point in an idle state;

wherein the time slot for downlink reception using the downlink service frequency point in the connected state comprises a time slot for receiving downlink control information, a time slot for receiving downlink data, a time slot for receiving a broadcast message, a time slot for receiving a paging message, and a time slot for receiving reference information;

the time slot for downlink reception using the downlink service frequency point in the idle state comprises a time slot for receiving downlink control information, a time slot for receiving a paging message, and a time slot for receiving reference information.

14. The information transmission method according to claim 11, wherein the step of acquiring configuration information of the target frequency point used in the random access procedure comprises:

acquiring, through pre-definition, configuration information of the target frequency point used in the random access procedure.

15. The information transmission method according to claim 11, wherein before the step of acquiring configuration information of the target frequency point used in the random access procedure, the method further comprises:

transmitting capability information of the mobile terminal to a base station, wherein the capability information is used to enable the base station to configure, based on the capability information, the target frequency point used by the mobile terminal in the random access procedure, and the capability information comprises a frequency point supported by the mobile terminal.

16. The information transmission method according to claim 11, wherein the step of performing the random access based on the acquired configuration information comprises:

transmitting a preamble sequence to a base station through the acquired configuration information; and receiving the second interactive message transmitted by the base station in the random access procedure;

wherein before the step of transmitting the preamble sequence to the base station through the acquired configuration information, the method further comprises:

receiving correspondence relationship between a grouping identifier of preamble sequences and a configured frequency point transmitted by the base station, and selecting, based on the correspondence relationship, the preamble sequence to be transmitted to the base station.

17. The information transmission method according to claim 11, wherein the step of performing the random access based on the acquired configuration information comprises:

in a case that a second interactive message transmitted by a base station or a Random Access Radio Network Temporary Identifier (RA-RNTI) used in the second interactive message carries the configuration message of the first target frequency point for a first subsequent interactive message and/or uplink data transmission, transmitting a third interactive message based on the configuration information of the first target frequency point; otherwise transmitting the third interactive message based on the acquired configuration information;

wherein the first subsequent interactive message comprises at least one of the third interactive message, a fourth interactive message, and a fifth interactive message;

wherein the third interactive message carries configuration information of a second target frequency point used for a second subsequent interactive message and/or uplink data transmission;

the second subsequent interactive message comprises at least one of the fourth interactive message and the fifth interactive message.

18. The information transmission method according to claim 11, wherein the step of performing the random access based on the acquired configuration information comprises:

receiving, after transmitting a third interactive message, a fourth interactive message transmitted by a base station.

19. A base station, comprising:

a first storage and a first processor, wherein the first storage stores a first computer program executable by the first processor, and when the first processor executes the first computer program, the first computer implements the steps in the information transmission method according to claim 1.

20. A mobile terminal, comprising:

a second storage, a second processor, wherein the second storage stores a second computer program executable by the second processor, and when the second processor executes the second computer program, the second processor implements:

acquiring configuration information of a target frequency point used in a random access procedure, wherein the configuration information comprises time slot information corresponding to the target frequency point and/or identification information of the target frequency point;

wherein after the step of acquiring configuration information of the target frequency point used in the random access procedure, the method further comprises:

performing random access based on the acquired configuration information;

the step of performing the random access based on the acquired configuration information, comprises:

using the acquired configuration information for transmitting a preamble sequence in a random access procedure;

wherein the step of performing the random access based on the acquired configuration information further comprises:

in a case that a Random Access Radio Network Temporary Identifier (RA-RNTI) used in a second interactive message carries configuration message of a first target frequency point for uplink data transmission, transmitting a third interactive message based on the configuration information of the first target frequency point; otherwise transmitting the third interactive message based on the acquired configuration information;

wherein the step of acquiring configuration information of the target frequency point used in the random access procedure comprises:

acquiring configuration information of the target frequency point through receiving at least one of a Radio Resource Control (RRC) reconfiguration message, a system message, and a broadcast message.

* * * * *